W. C. FISHER.
CARTRIDGE BELT.
APPLICATION FILED JULY 1, 1909.
970,905.
Patented Sept. 20, 1910.
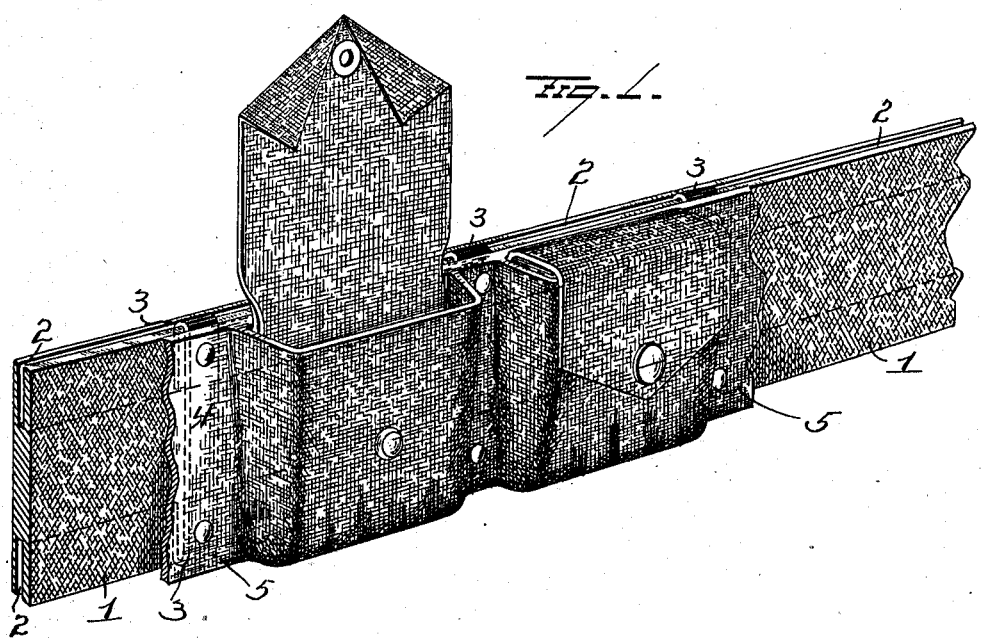
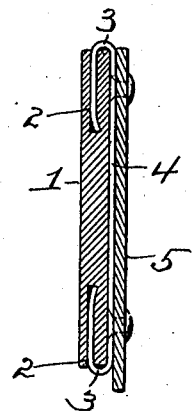
WITNESSES
INVENTOR
W. C. Fisher
Attorney

UNITED STATES PATENT OFFICE.

WILLIAM C. FISHER, OF MIDDLETOWN, CONNECTICUT.

CARTRIDGE-BELT.

970,905.   Specification of Letters Patent.   Patented Sept. 20, 1910.

Application filed July 1, 1909. Serial No. 505,482.

*To all whom it may concern:*

Be it known that I, WILLIAM C. FISHER, of Middletown, in the county of Middlesex and State of Connecticut, have invented certain new and useful Improvements in Cartridge-Belts; and I do hereby declare the following to be a full, clear, and exact description of the invention, such as will enable others skilled in the art to which it appertains to make and use the same.

This invention relates to improvements in cartridge belts and more particularly to the manner of connecting a pocketed carrier to the belt proper,—one object of the invention being to so construct the belt that the carrier can be easily and quickly applied thereto in the dark and at the same time protect the wearer from discomfort of the metallic connecting devices of the carrier.

A further object is to so construct the belt that the carrier when applied thereto will lie flat against the belt and automatically adjust itself to the belt when the latter, with the carrier, is being applied to the body of the wearer.

With these objects in view the invention consists in certain novel features of construction and combinations of parts as hereinafter set forth and pointed out in the claims.

In the accompanying drawings, Figure 1 is a view of a cartridge belt showing the application of my improvements thereto, and Fig. 2 is a transverse sectional view of the same.

1 represents a multi-ply woven fabric belt in which the binder threads are omitted for short distances from the upper and lower edges of the belt so as to leave the plies separated at such upper and lower edges from one end of the belt to the other,—thus forming at respective edges of the belt continuous recesses 2. These recesses are to receive the hooked upper and lower ends 3 of metallic attaching devices 4 for pocketed carriers 5. The carriers 5 are woven fabric sections having cartridge pockets woven thereon and the metallic attaching devices 4 are secured to the carrier by means of rivets and the hooked upper and lower ends of the metallic attaching devices which enter the recesses 2 in the upper and lower edges of the belt 1, are bent inwardly at their free ends so as to slightly clamp the material of the belt. By causing the hooked ends of the attaching devices to enter between the plies of the belt, the wearer is protected from said hooked attaching devices and by making the recesses 2 continuous, the carrier can be easily attached to the belt in the dark and the inconvenience of searching for pockets into which to insert the hooks of the attaching devices will be avoided. Furthermore by making the recesses 2 continuous, the carrier will always lie flat against the belt and will readily adapt itself to the belt and thus prevent all puckering of the carrier or the belt as is liable to occur when narrow pockets are provided on the belt for the reception of the metallic attaching devices on account of unequal expansion and contraction of the carrier and the belt.

Having fully described my invention what I claim as new and desire to secure by Letters-Patent, is,—

1. The combination with a belt having parallel continuous recesses, of a pocketed carrier and metallic attaching devices secured to said carrier and provided with hooked ends to enter said continuous recesses.

2. The combination with a woven fabric belt having a plurality of plies, the upper and lower portions of said plies being separated forming continuous recesses at respective edges of said belt, of a pocketed carrier, and metallic attaching devices secured to said carrier and having hooked ends entering the continuous recesses formed between the separated plies at the edges of the belt.

In testimony whereof, I have signed this specification in the presence of two subscribing witnesses.

WILLIAM C. FISHER.

Witnesses:
E. KENT HUBBARD, Jr.,
J. L. DOLBIAN.